(12) United States Patent
Colton

(10) Patent No.: US 8,084,133 B2
(45) Date of Patent: Dec. 27, 2011

(54) TINTABLE FILM-FORMING COMPOSITIONS HAVING HIGH REFRACTIVE INDICES AND COATED OPTICAL ARTICLES USING SAME

(75) Inventor: James P. Colton, Trafford, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 603 days.

(21) Appl. No.: 12/197,371

(22) Filed: Aug. 25, 2008

(65) Prior Publication Data

US 2010/0035067 A1  Feb. 11, 2010

Related U.S. Application Data

(60) Provisional application No. 61/086,567, filed on Aug. 6, 2008.

(51) Int. Cl.
*B32B 9/04* (2006.01)

(52) U.S. Cl. ............... 428/447; 428/425.5; 524/408; 524/413; 524/430

(58) Field of Classification Search .............. 428/447, 428/425.5; 524/408, 413, 430
See application file for complete search history.

(56) References Cited

U.S. PATENT DOCUMENTS

| | | |
|---|---|---|
| 3,361,706 A | 1/1968 | Meriwether et al. |
| 4,931,220 A | 6/1990 | Haynes et al. |
| 5,026,793 A | 6/1991 | Nakai et al. |
| 5,284,919 A | 2/1994 | Nakai et al. |
| 5,389,727 A | 2/1995 | Nakai et al. |
| 5,492,968 A | 2/1996 | Nakai et al. |
| 5,645,767 A | 7/1997 | Van Gemert |
| 5,658,501 A | 8/1997 | Kumar et al. |
| 6,025,026 A | 2/2000 | Smith et al. |
| 6,150,430 A | 11/2000 | Walters et al. |
| 6,153,126 A | 11/2000 | Kumar |
| 6,296,785 B1 | 10/2001 | Nelson et al. |
| 6,348,604 B1 | 2/2002 | Nelson et al. |
| 6,353,102 B1 | 3/2002 | Kumar |
| 6,933,006 B2 * | 8/2005 | Fey et al. ................. 427/146 |
| 7,510,746 B2 * | 3/2009 | Loeffler et al. ............ 427/496 |
| 2002/0061407 A1 * | 5/2002 | Colton et al. ............. 428/447 |
| 2004/0021133 A1 | 2/2004 | Nagpal et al. |
| 2006/0241273 A1 | 10/2006 | Bojkova et al. |
| 2007/0142604 A1 | 6/2007 | Bojkova et al. |
| 2007/0142606 A1 | 6/2007 | Bojkova et al. |
| 2007/0270548 A1 | 11/2007 | Bojkova et al. |
| 2008/0081270 A1 * | 4/2008 | Tanaka ....................... 430/7 |
| 2008/0226994 A1 * | 9/2008 | Murakami et al. ............ 430/7 |

FOREIGN PATENT DOCUMENTS

| | | |
|---|---|---|
| EP | 0 681 003 A2 | 11/1995 |
| WO | WO 2004/011506 A1 | 2/2004 |
| WO | WO 2007/043301 A1 | 4/2007 |
| WO | WO 2007/118024 A1 | 10/2007 |

\* cited by examiner

*Primary Examiner* — Thao T. Tran
(74) *Attorney, Agent, or Firm* — Deborah M. Altman

(57) ABSTRACT

Provided are curable film-forming compositions are provided including:
(a) a binder of an alkoxysilane;
(b) a metal oxide compound containing titanium, zirconium, cerium, niobium, tantalum, and/or tin; and
(c) a polyglycidyl ether. Also provided are optical articles including a substrate and the curable film-forming composition superposed on a surface thereof.

22 Claims, No Drawings

TINTABLE FILM-FORMING COMPOSITIONS HAVING HIGH REFRACTIVE INDICES AND COATED OPTICAL ARTICLES USING SAME

CROSS-REFERENCE TO RELATED APPLICATIONS

This application claims the benefit of priority of U.S. Provisional Application No. 61/086,567, filed Aug. 6, 2008.

FIELD OF THE INVENTION

The present invention relates to tintable film-forming compositions demonstrating high refractive indices and to their use as coatings on optical articles.

BACKGROUND OF THE INVENTION

Polymeric organic materials that typically are used to make optical elements, transparent sheets and films, often have surfaces that are susceptible to abrasion and chemical attack. To prevent damage, such materials may be coated with a protective coating to improve their abrasion resistance.

Numerous protective coatings of various chemistries have been developed in the optical art. For example, coatings that incorporate epoxy-containing silane monomers, aluminum compounds and other silane monomers have been described in the literature. Coatings prepared from a colloidal dispersion of a water-insoluble dispersant such as aluminum oxide in a water-alcohol solution of selected organotrialkoxysilanes have also been developed. Hard coat compositions such as epoxy group-containing difunctional alkoxysilanes, tetrafunctional silanes, colloidal titania or alumina and curing catalysts are also among the conventional systems.

Incorporation of colorants, or tints, into certain abrasion resistant coatings has proven to be difficult. Often the tint application can be non-uniform, resulting in a "blotchy" appearance. Birefringence of coating layers has also been observed as an undesirable effect. It is particularly disadvantageous in fashion lenses, where aesthetics can be critical.

It would be desirable to provide optical articles having coatings that provide abrasion resistance while further allowing for homogeneous tintability, minimal birefringence, and compatibility with anti-reflective coatings.

SUMMARY OF THE INVENTION

The present invention is directed to curable film-forming compositions comprising.
(a) a binder comprising an alkoxysilane;
(b) a metal oxide compound containing titanium, zirconium, cerium, niobium, tantalum, and/or tin; and
(c) a polyglycidyl ether. Also provided are optical articles comprising a substrate and the curable film-forming composition superimposed on a surface thereof.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photoinitiation such as by exposure to ultraviolet light or other actinic radiation.

The term "cure", "cured" or similar terms, as used in connection with a cured or curable composition, e.g., a "cured composition" of some specific description, means that at least a portion of any polymerizable and/or crosslinkable components that form the curable composition is polymerized and/or crosslinked. Additionally, curing of a composition refers to subjecting said composition to curing conditions such as those listed above, leading to the reaction of the reactive functional groups of the composition. The term "at least partially cured" means subjecting the composition to curing conditions, wherein reaction of at least a portion of the reactive groups of the composition occurs. The composition can also be subjected to curing conditions such that a substantially complete cure is attained and wherein further curing results in no significant further improvement in physical properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "light influencing function", "light influencing property" or terms of like import means that the indicated material, e.g., coating, film, substrate, etc., is capable of modifying by absorption (or filtering) of incident light radiation, e.g., visible, ultraviolet (UV) and/or infrared (IR) radiation that impinges on the material. In alternate embodiments, the light influencing function can be light polarization, e.g., by means of a polarizer and/or dichroic dye; a change in light absorption properties, e.g., by use of a chromophore that changes color upon exposure to actinic radiation, such as a photochromic material; transmission of only a portion of the incident light radiation, e.g., by use of a fixed tint such as a conventional dye; or by a combination of one or more of such light influencing functions.

The term "adapted to possess at least one light influencing property", as used for example in connection with a rigid optical substrate, means that the specified item is capable of having the light influencing property incorporated into or appended to it. For example, a plastic matrix that is adapted to possess a light influencing property means that the plastic matrix has sufficient internal free volume to accommodate internally a photochromic dye or tint. The surface of such a plastic matrix may alternatively be capable of having a photochromic and/or polarizing and/or tinted layer, film or coating appended to it.

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate, means that the specified item is self-supporting.

The term "optical substrate" means that the specified substrate exhibits a light transmission value (transmits incident light) of at least 4 percent and exhibits a haze value of less than 1 percent, e.g., less than 0.5 percent, when measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "photochromic receptive" means that the indicated item has sufficient free volume to permit photochromic material(s) incorporated within it to transform from its colorless form to its colored form (and then revert to its colorless form) to the degree required for commercial optical applications.

The term "tinted", as used for example in connection with ophthalmic elements and optical substrates, means that the indicated item contains a fixed light radiation absorbing agent, such as but not limited to, conventional coloring dyes, infrared and/or ultraviolet light absorbing materials on or in the indicated item. The tinted item has an absorption spectrum for visible radiation that does not vary significantly in response to actinic radiation.

The term "non-tinted", as used for example in connection with ophthalmic elements and optical substrates, means that that the indicated item is substantially free of fixed light radiation absorbing agents. The non-tinted item has an absorption spectrum for visible radiation that does not vary significantly in response to actinic radiation.

The term "actinic radiation" includes light with wavelengths of electromagnetic radiation ranging from the ultraviolet ("UV") light range, through the visible light range, and into the infrared range. Actinic radiation which can be used to cure coating compositions used in the present invention generally has wavelengths of electromagnetic radiation ranging from 150 to 2,000 nanometers (nm), from 180 to 1,000 nm, or from 200 to 500 nm. In one embodiment, ultraviolet radiation having a wavelength ranging from 10 to 390 nm can be used. Examples of suitable ultraviolet light sources include mercury arcs, carbon arcs, low, medium or high pressure mercury lamps, swirl-flow plasma arcs and ultraviolet light emitting diodes. Suitable ultraviolet light-emitting lamps are medium pressure mercury vapor lamps having outputs ranging from 200 to 600 watts per inch (79 to 237 watts per centimeter) across the length of the lamp tube.

The term "tinted photochromic", as used, for example, in connection with ophthalmic elements and optical substrates, means that the indicated item contains a fixed light absorbing agent and a photochromic material. The indicated item has an absorption spectrum for visible radiation that varies in response to actinic radiation and is thermally reversible when the actinic radiation is removed. For example, the tinted photochromic item may have a first characteristic of the light absorbing agent, e.g., a coloring tint, and a second color characteristic of the combination of the light absorbing agent and the activated photochromic material when the photochromic material is exposed to actinic radiation.

The term "dichroic material", "dichroic dye" or terms of like import means a material/dye that absorbs one of two orthogonal plane-polarized components of transmitted radiation more strongly than the other. Non-limiting examples of dichroic materials include indigoids, thioindigoids, merocyanines, indans, azo and poly(azo) dyes, benzoquinones, naphthoquinones, anthraquinones, (poly)anthraquinones, anthrapyrimidinones, iodine and iodates. The term "dichroic" is synonymous with "polarizing" or words of like import.

The term "photochromic dichroic" means a specified material or article that exhibits both dichroic and photochromic properties. In alternate non-limiting embodiments, the specified material can include both photochromic dyes/compounds and dichroic dyes/compounds, or single dyes/compounds that possess both photochromic and dichroic properties.

The term "transparent", as used for example in connection with a substrate, film, material and/or coating, means that the indicated substrate, coating, film and/or material has the property of transmitting light without appreciable scattering so that objects lying beyond are entirely visible.

The term "photochromic amount" means that a sufficient amount of photochromic material is used to produce a photochromic effect discernible to the naked eye upon activation. The particular amount used depends often upon the intensity of color desired upon irradiation thereof and upon the method used to incorporate the photochromic materials. Typically, the more photochromic incorporated, the greater is the color intensity but only up to a certain limit. There is a point after which the addition of any more material will not have a noticeable effect, although more material can be added, if desired.

The curable film-forming compositions of the present invention are sol-gel systems and comprise a binder (a), which, in turn, comprises an alkoxysilane. The alkoxysilane has the general formula $R^1_m Si(OR^2)_{4-m}$, wherein each $R^1$ may be the same or different and represents an organic radical; each $R^2$ may be the same or different and represents a $C_1$ to $C_4$ alkyl group, and m is 0 to 3. $R^1$ can be $C_1$ to $C_6$ alkyl, vinyl, methoxyethyl, phenyl, γ-glycidoxypropyl, or γ-methacryloxypropyl. $R^2$ can be methyl, ethyl, propyl or butyl. Examples of suitable alkoxysilanes include methyl triethoxysilane, 3-glycidoxypropyl trimethoxysilane, tetramethoxysilane, tetraethoxysilane, and acryloxysilane.

For purposes of the present invention, the alkoxysilane typically is dissolved in an organic solvent, for example, an alcohol, and partially hydrolyzed with water according to the following reaction:

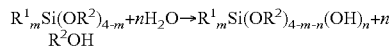
$$R^1_m Si(OR^2)_{4-m} + nH_2O \rightarrow R^1_m Si(OR^2)_{4-m-n}(OH)_n + nR^2OH$$

The amount of the binder (a) in the curable film-forming composition can vary depending in part upon the intended application of the composition. For example, the binder (a) can be present in an amount ranging from 25 to 95 percent by weight, based on the total weight of solids present in the curable film-forming composition.

After the alkoxysilane in the binder (a) is partially hydrolyzed, a metal oxide compound is added. The metal oxide compound can comprise titanium, zirconium, cerium, niobium, tantalum, and/or tin. The metal oxide compound may comprise one or more different metal oxides ($M_xO_y$, wherein x is 1 or 2 and y is 1 to 4) and/or metal alkoxides having the general formula:

$$M(OR^3)_4$$

wherein M is any of the metals listed above, for example, titanium or zirconium, and $R^3$ represents a low molecular weight monovalent alkyl group such as methyl, ethyl, n-propyl, isopropyl, n-butyl or isobutyl. The metal alkoxide may be In dimer or higher condensed form so long as alkoxy groups remain reactive with silanol groups of the partially hydrolyzed alkoxysilane.

A metal alkoxide reacts with the partially hydrolyzed alkoxysilane to form a network of silicon-oxygen-metal bonds according to the following general reaction:

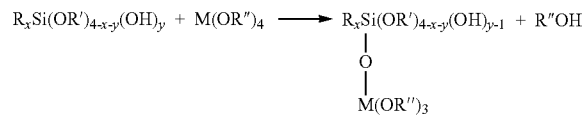

When the metal alkoxide has completely reacted with the partially hydrolyzed alkoxysilane, additional water may be added to hydrolyze the composition, i.e., to convert remaining alkoxy groups of either the alkoxysilane or the metal alkoxide to hydroxyl groups according to the reaction:

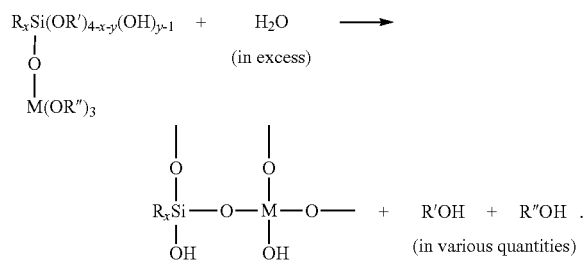

Suitable examples of metal oxide compounds can include cerium oxide, titanium alkoxide, zirconium alkoxide, and/or tin oxide. In a particular embodiment of the present invention, the metal oxide compound (b) comprises cerium oxide and titanium n-butoxide. The metal oxide compound (b) is used in an amount ranging from 0.1 to 65 percent by weight, such as from 1 to 25 percent by weight based on the total weight of solids in the curable film-forming composition.

The curable film-forming composition of the present invention further comprises (c) a polyglycidyl ether, such as a diglycidyl ether and/or a triglycidyl ether. Higher polyglycidyl ethers also can be utilized. Polyhydric alcohols that may be used to prepare the polyglycidyl ether include, for example, ethylene glycol, propylene glycol, butylene glycol, 1,6-hexylene glycol, neopentyl glycol, diethylene glycol, glycerol, trimethylol propane, resorcinol, catechol, hydroquinone, and pentaerythritol. Examples of suitable polyglycidyl ethers can include resorcinol diglycidyl ether and trimethylolpropane triglycidyl ether. Combinations of polyglycidyl ethers are also suitable, as noted above.

The polyglycidyl ether (c) typically is present in the curable film-forming compositions of the present invention in an amount ranging from 1 to 65 percent by weight, such as from 5 to 50 percent by weight, based on the total weight of solids in the curable film-forming composition. The presence of the polyglycidyl ether in the curable film-forming compositions of the present invention facilitates homogeneous tinting thereof. That is, the polyglycidyl ether promotes more even distribution of a colorant throughout the compositions, compared to a similar composition that does not contain a polyglycidyl ether, without compromising abrasion resistance or compatibility with subsequently applied coatings, particularly anti-reflective coatings.

The weight ratio of the binder (a) to the polyglycidyl ether (c) in the curable film-forming composition of the present invention may range from 50:50 to 90:10. Typically, the weight ratio of the binder (a) to the polyglycidyl ether (c) in the curable film-forming composition of the present invention can be 70:30.

The curable film-forming compositions of the present invention can include a variety of optional ingredients and/or additives that are somewhat dependent on the particular application of the curable composition. For example, the composition may be tinted and contain a colorant. The curable film-forming compositions of the present invention are particularly suitable for tinting. Other optional ingredients include rheology control agents, surfactants, initiators, catalysts, cure-inhibiting agents, reducing agents, acids, bases, preservatives, free radical donors, free radical scavengers and thermal stabilizers, which adjuvant materials are known to those skilled in the art.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the compositions of the present invention.

Example colorants include pigments, dyes and tints, such as those listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Examples of suitable dyes can include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Photochromic dyes are suitable for use in the curable film-forming composition of the present invention, either alone or in combination with other colorants. The photochromic materials can include the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline) naphthoxazines, spiro(indoline)pyridobenzoxazines, spiro(benzindoline)pyridobenzoxazines, spiro(benzindoline) naphthoxazines and spiro(indoline)benzoxazines; mercury dithizonates, fulgides, fulgimides and mixtures of such photochromic compounds. Such photochromic compounds and complementary photochromic compounds are described in U.S. Pat. No. 4,931,220 at column 8, line 52 to column 22, line 40; U.S. Pat. No. 5,645,767 at column 1, line 10 to column 12, line 57; U.S Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Other photochromic materials that can be used include organo-metal dithiozonates, i.e., (arylazo)-thioformic arylhydrazidates, e.g., mercury dithizonates which are described in, for example, U.S. Pat. No. 3,361,706, at column 2, line 27 to column 8, line 43; and fulgides and fulgimides, e.g., the 3-furyl and 3-thienyl fulgides and fulgimides, which are described in U.S. Pat. No. 4,931,220, at column 1, line 39 through column 22, line 41. Likewise, the curable film forming compositions of the present invention also can comprise photochromic-dichroic dyes and/or conventional dischroic dyes as are known in the art.

The compositions of the present invention are typically waterborne liquids, having a viscosity that allows them to be at least sprayable. The compositions contain water and may additionally contain one or more organic solvents that are at least partially miscible with water, such as methanol, ethanol, n-propanol, isopropanol, n-butanol, and the like.

Upon application to a substrate and curing, the curable film-forming compositions of the present invention demonstrate a refractive index greater than 1.5, for example 1.55 to 1.65, such as 1.58 to 1.60.

The present invention further provides optical articles comprising:
(a) a substrate; and
(b) a curable film-forming composition superimposed on at least one surface of the substrate. The curable film-forming composition comprises any of those described above.

Optical articles of the present invention include ophthalmic articles such as plano (without optical power) and vision correcting (prescription) lenses (finished and semi-finished) including multifocal lenses (bifocal, trifocal, and progressive lenses); and ocular devices such as contact lenses and intraocular lenses, sun lenses, fashion lenses, sport masks, face shields and goggles. The optical element may also be chosen from glazings such as windows and vehicular transparencies such as automobile windshields and side windows. The optical element can possess a light influencing property such as a tint, photochromism and/or dichroism.

Substrates suitable for use in the preparation of the optical articles of the present invention can include any of the optical substrates known in the art and can include nonplastic substrates such as glass. Suitable examples of plastic optical substrates, can include polyol(allyl carbonate) monomers, e.g., allyl diglycol carbonates such as diethylene glycol bis (allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc; poly-ol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly (vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The substrate itself may be transparent, or the substrate may possess a light influencing property such as a tint, photochromism and/or dichroism. Also, the substrate may be adapted to possess at least one light influencing property.

In a particular embodiment of the present invention, the refractive index of the substrate is at least 1.55. For example the refractive index of the substrate can range from 1.55 to 1.67, such as from 1.55 to 1.65. In such instances, the substrate can comprise polycarbonate, sulfur-containing polyurethanes and/or sulfur-containing polyurethane(ureas). Suitable examples of substrates comprising sulfur-containing polyurethanes and sulfur-containing polyurethane(ureas) can include those described in U.S. Patent Publication No. 2006/0241273A1, filed Feb. 22, 2006, at paragraphs [0010] to [0269], incorporated by reference herein. Also, suitable examples of substrates comprising sulfur-containing polyurethanes and sulfur-containing polyurethane(ureas) can include those prepared from a composition comprised of the thioether-functional oligomeric polythiols described in U.S. Patent Publication No. 2007/0270548A1, filed May 4, 2007 at paragraphs [0053] to [0247], incorporated by reference herein. Further suitable examples of sulfur-containing polyurethanes can include those described in U.S. Patent Publication No. 2007/0142604A1, filed Dec. 16, 2005, at paragraph nos. [0007] to [0020]; [0023] to [0032]; [0034] to [0036]; and [0038] to [0272], all of the cited portions being incorporated by reference herein. Likewise, suitable examples of sulfur-containing polyurethane(ureas) can include those described in U.S. Patent Publication No. 2007/0142606A1, filed Dec. 16, 2005, at paragraph nos. [0006] to [0022]; [0025] to [0034]; [0036] to [0038]; and [0040] to [0296], all of the cited portions being incorporated by reference herein.

For some end use applications, it may be desirable to substantially match the refractive index of the cured film-forming compositions of the present invention (which can demonstrate a refractive index greater than 1.5, for example 1.55 to 1.65, such as 1.58 to 1.60) to the refractive index of the substrate (which can demonstrate a refractive index of at least 1.55, for example from 1.55 to 1.67, such as from 1.55 to 1.65) to which the film-forming composition is applied. Such a refractive index match of the cured film-forming composition and the substrate can serve to minimize or eliminate altogether "interference patterns" that can result from too great a difference between the refractive indices of the cured film-forming composition and the substrate. Typically, such interference patterns can be observed visually and are often referred to as "rainbow" patterns or "oil slick" patterns noted on the surface of the coated substrate.

In a particular embodiment of the present invention, the difference between the refractive index of the substrate and the cured film-forming composition that is superimposed on the substrate surface is not more than +/−0.04, for example not more than +/−0.03, such as not more than +/−0.02.

In some cases, a primer coating is applied to the substrate surface prior to application of the curable film-forming composition. The primer coating is interposed between the substrate and the curable film-forming composition, and serves as a barrier coating to prevent interaction of the polymeric coating components with the substrate and vice versa, and/or as an adhesive layer to promote adhesion of the curable film-forming composition to the substrate surface. The primer may be applied to the substrate by any known method, e.g., spray, spin, spread, curtain, roll or dip coating; and may be applied to a cleaned and untreated or cleaned and treated, e.g., chemically treated or plasma treated, surface of the substrate. Primer coatings are well known to those skilled in the art. Selection of an appropriate primer coating will depend on the substrate used, i.e., the primer coating must be chemically and physically compatible with the surface of the substrate and the curable film-forming composition, while providing the functional benefits desired for the primer coating, i.e., barrier and adhesive properties.

The primer coating may be one or several monomolecular layers thick, and can range from 0.1 to 10 microns, such as from 0.1 to 2 or 3 microns. The thickness of the primer can vary between any combination of the aforementioned values, inclusive of the recited values. One suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430, which disclosure is incorporated herein by reference.

A further example of a suitable primer coating is described in U.S. Pat. No. 6,025,026, which describes a composition that is substantially free of organosiloxanes and which comprises organic anhydrides having at least one ethylenic linkage and an isocyanate-containing material. Such disclosure is incorporated also herein by reference. After application of the primer, the substrate may be rinsed with an alcohol such as 2-propanol and then water, and dried for up to half an hour at a temperature ranging from 60° C. to 80° C.

The curable film-forming composition may be applied to the substrate by one or more of a number of methods such as spraying, dipping (immersion), spin coating, or flow coating onto a surface thereof. Immersion is used most often. The curable film-forming composition is dried to remove alcohol and water solvents, and then heated to a temperature of 125° to 135° C. for up to two hours, to promote the continued condensation polymerization of the composition, and to cure to a dense, glassy, abrasion-resistant film.

As noted above, the curable film-forming composition may be tinted prior to application to the substrate by mixing in a colorant. Alternatively, the optical article may be tinted by immersion into a dispersion or solution of a colorant after curing of the curable film-forming composition.

Additional coating layers or films common to the optical art may be applied to the optical article on top of the curable film-forming composition. For example, a separate photochromic coating layer may be applied. This photochromic layer may be in addition to any colorants, including photochromic dyes, in the curable film-forming composition (b). Anti-reflective coatings may also be applied to the optical articles of the present invention. The curable film-forming compositions used in the optical articles of the present invention are particularly compatible with anti-reflective coatings comprising vacuum deposited metal oxide layers or solution-applied anti-reflective coatings. Additional anti-abrasion coatings may be applied on top of other coatings.

The optical article of the present invention demonstrates improved abrasion resistance. The scratch resistance of the cured film-forming composition may be measured by the conventional steel wool scratch test. This test measures the average haze gain of a surface subjected to abrasion by very fine steel wool, using Colts approved 0000 steel wool with 5 lbs load for 200 cycles. The average haze gain is typically less than 20, often less than 15, more often less than 10, and still more often less than 8. An Eberbach Steel Wool Abrasion Tester can be used to determine surface scratch resistance.

In performing the steel wool scratch test, 0000 steel wool, e.g., Rhodes extra fine steel wool, is mounted over the end of a one-inch (2.54 cm) by one-inch (2.54 cm) mandrel. The sample to be tested, e.g., a lens, is cleaned with mild warm soapy water, rinsed with water, and then air-dried. The lens is then conditioned for at least 2 hours at 23+/−3° C. and 50%+/−10% relative humidity. The light transmission of the sample at 550 nm is measured using a Haze Gard Plus instrument, which is manufactured by BYK-Gardner. The conditioned sample is mounted onto the Eberbach testing platform. If a lens is to be tested, it is centered on the testing platform with the concave side down. The mandrel is weighted with 5 pounds (2.3 kg) of weight and lowered onto the sample. The sample is cycled back and forth under and in contact with the steel wool at a rate of 100 times per minute for two minutes so that the sample passes under the steel wool 200 times. The sample is cleaned again with mild warm soapy water, rinsed with water and dried. The light transmission of the sample at 550 nm is re-measured. The difference between the light transmission values before and after testing, i.e., the delta (Δ) in light transmission, is the haze gain.

A Bayer Abrasion Tester also can be used to determine surface abrasion resistance. The resistance of a product to abrasion is quantified by measuring the haze of the test sample after abrasion and comparing that value to that measured on a control sample, e.g., a plano lens prepared from diethylene glycol bis(allyl carbonate) in the case of an ophthalmic product. Usually, measurements are made on multiple pairs of test sample/controls, e.g., 5 pairs, to ensure statistically significant results. The samples and controls to be tested are cleaned with mild soapy water, rinsed with water and then dried with air. The test samples and controls are conditioned for a minimum of 2 hours, while the abrasive material is conditioned for a minimum of 24 hours, in a temperature and humidity controlled environment (23+/−3° C. and 50+/−10% relative humidity). The light transmission of the test sample and control at 550 nm is measured using a Haze-Gard Plus device. The test sample and control are mounted on the Bayer Abrader and the abrasion medium, e.g., alumina (Norton ZF E-327 grit #12), placed in the pan of the Abrader. When lenses are tested, they are mounted convex side down. The Abrader is operated for 4 minutes at a rate of 150 cycles per minute for a total of 600 cycles. Both the test samples and controls are cleaned with mild soapy water, rinsed and dried with air. The haze of the test samples and controls are again measured at 550 nm using the Haze Gard Plus device. The haze gain is calculated from the difference in light transmission values before and after abrading. The Bayer Haze Gain Ratio is determined by dividing the measured haze of the control by that of the test sample (Haze Gain Ratio=Haze (control)/Haze (test sample). The Bayer haze gain ratio for the radiation cured AB film should be greater than 0.6, preferably greater than 0.8.

The following examples are intended to illustrate various embodiments of the invention, and should not be construed as limiting the invention in any way.

EXAMPLES

Example 1

γ-Glycidoxypropyltrimethoxysilane, 775 grams, and a dilute solution of nitric acid, 77.5 grams, prepared by adding 1.0 gram of 70 weight percent nitric acid to 7 L of deionized water, were added to a clean, dry 5 L reactor with stirring. Within fifteen minutes, the exotherm generated from the hydrolysis of the silanes caused an increase in the temperature of the reaction mixture from 20° C. to 35° C. A 50/50 weight ratio of DOWANOL® PM and PMA solvents, 744 grams, was added to the mixture with stirring and the temperature of the reaction mixture was lowered to 15° C. with an ice bath. Titanium n-butoxide (693 grams) was added and the resulting exotherm caused an increase in the temperature of the reaction mixture within 15 minutes to 30° C. The temperature of the reaction mixture was lowered to 15° C. with an ice bath. Cerium oxide, 704 grams of a 20 weight percent aqueous solution was added and the resulting exotherm caused an increase in the temperature of the reaction mixture within 15 minutes to 30° C. The temperature of the reaction mixture was lowered to 20-25° C. with an ice bath. Ammonium hydroxide, 39 grams of a 29 weight percent aqueous solution, was added to adjust the pH from 3 to 7. A magenta dye solution, 119 grams, prepared as a 25 weight percent solution of MOR-PLAS® magenta dye in a 50/50 weight ratio of DOWANOL® PM and PMA solvents, was added to the reaction mixture with stirring. A mixture of trimethylolpropane triglycidyl ether, 404 grams, 50/50 weight ratio of DOWANOL® PM and PMA solvents, 940 grams, and BYK®-306 additive, 4.5 grams, which is reported to be a polyether modified dimethylpolysiloxane copolymer in solvent, was added and the resulting mixture was stirred for at least 30 minutes maintained at a temperature of 20-25° C. The resulting coating solution was filtered through a nominal 0.45 micron capsule filter and stored at −20° C. until use. The refractive index of the coating solution was 1.58.

Comparative Examples 1 and 2

Hi-Gard® 1080T, which has a refractive index of 1.51, was used as Comparative Example 1 (CE-1). Hi-Gard ® 1600LC, which has a refractive index of 1.58, was used as Comparative Example 2 (CE-2). CE-2 produced a coating that was relatively non-tintable, as shown by the results in Table 2, when compared to the coatings of Example 1 and CE-1. Both products used as the Comparative Examples are available from PPG Industries, Inc.

Example 2

Part A

Finished 6-base plano lenses identified as MR-20 lenses (available from That Optical Group) were soaked in a 12.5 weight percent sodium hydroxide solution in an ultrasonic bath maintained at 50° C. for 5 minutes; rinsed in an ultrasonic bath containing deionized water maintained at 50° C.; rinsed with isopropyl alcohol; and dried at ambient temperature.

Part B

The coating solutions of Example 1 and Comparative Examples 1 and 2 were warmed to room temperature (about 20-24° C.) with stirring, if necessary, and applied to the lenses prepared in Part A by dipcoating. The withdrawal rate used was 15 centimeters per minute. Afterwards, the lenses were dried and cured in an air circulating oven for 20 minutes at 60° C. followed by 3 hours at 105° C.

Part C

Abrasion resistance of the lenses prepared in Part B was determined using ASTM F735-81 Standard Test Method for Abrasion Resistance of Transparent Plastics and Coatings Using the Oscillating Sand Method. The test samples were exposed to 600 cycles of oscillation in the ASTM Test Method using alundum (500 grams). The Bayer Abrasion Resistance Index (BARI), listed in Table 1 for single samples, was calculated by dividing the percent haze of an uncoated test Control sample made of a homopolymer prepared from CR-39® monomer by the percent haze of the coated test sample. The resulting number is an indication of how much more abrasion resistant the coated test sample is as compared to the uncoated test square. The haze and transmission results before and after abrasion testing were measured with a Hunter Lab Model DP25P Colorimeter.

Part D

Lenses coated with Example 1 and Comparative Examples 1 and 2 were tested using the Tintability Test to quantitatively determine their tintability. The Tintability Test was used to measure the uptake of dye by both sides of a lens.

The dye solutions for the Tintability Test were prepared by adding either 1 part BPI Molecular Catalytic Black Dye or Turbo Brown Dye available from Brain Power Incorporated and 10 parts deionized water to a beaker that was maintained at a temperature of 95±5° C. The resulting dye solutions were stirred for 1 hour prior to testing.

The lenses for the Tintability Test were washed in soapy water, rinsed with water, dried, placed in clamping devices and immersed in the dye bath with stirring.

Lenses were removed from the dye bath in the Tintability Test after the times indicated in Tables 2 and 3. The lenses were immersed in and rinsed with deionized water, air dried at room temperature or manually wiped with absorbent tissue and tested in a Hunter spectrophotometer for percent transmission.

The percent transmission through a 1 inch diameter area of each sample lens was determined after the dye bath immersion interval. The tintability of the coated lens corresponded to the percent transmission, e.g., the greater the percent transmission, the less tintable the lens, the lower the percent transmission, the more tintable the lens. The results for single lenses are listed in Tables 2 and 3.

Part E

Individual lenses coated with Example 1 and Comparative Examples 1 and 2 were tested for refractive index interference fringes. The determination was made under fluorescent light by using unaided visual examination of each lens against a black background. Refractive index interference fringes appear as an "oil slick effect" or "rainbow effect" on the coated lens. The lens coated with Comparative Example 1 displayed refractive index interference fringes. The lenses coated with Example 1 and Comparative Example 2 did not show refractive index interference fringes.

TABLE 1

| Example Number | Delta Haze | BARI |
|---|---|---|
| Control | 11.50 | 1.0 |
| 1 | 4.15 | 2.78 |
| CE-1 | 4.42 | 2.60 |
| CE-2 | 2.18 | 5.28 |

TABLE 2

| Black Dye | | |
|---|---|---|
| Example Number | Immersion Time (mins.) | Percent Transmittance |
| 1 | 0 | 89.27 |
| 1 | 5 | 12.33 |
| 1 | 10 | 9.74 |
| CE-1 | 0 | 91.10 |
| CE-1 | 5 | 36.50 |
| CE-1 | 10 | 21.90 |
| CE-2 | 0 | 88.62 |
| CE-2 | 10 | 85.66 |

TABLE 3

| Turbo Brown Dye | | |
|---|---|---|
| Example Number | Immersion Time (mins.) | Percent Transmittance |
| 1 | 10 | 1.79 |
| CE-1 | 10 | 8.16 |

The results of Table 1 showed that the lenses coated with the coating of Example 1 were more abrasion resistant that the Control sample (lenses prepared from CR-39® monomer and the lenses coated with the coating of CE-1), and were less abrasion resistant than the lenses coated with the coating of CE-2. The results of Table 2 show that the lenses coated with the coating of Example 1 were more tintable with black dye than the lenses coated with the coatings of Comparative Examples 1 and 2, respectively. The results of Table 3 show that lenses coated with the coating of Example 1 were more tintable with brown dye than the lenses coated with the coating of Comparative Example 1.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A curable film-forming sol-gel composition comprising:
   (a) a binder comprising a hydrolyzed alkoxysilane present in the curable film-forming composition in an amount ranging from 25 to 95 percent by weight, based on the total weight of solids in the curable film-forming composition;
   (b) a metal oxide compound containing titanium, zirconium, cerium, niobium, tantalum, and/or tin;
   (c) a polyglycidyl ether present in the curable film-forming composition in an amount ranging from 1 to 65 percent by weight, based on the total weight of solids in the curable film-forming composition; and
   (d) a metal alkoxide reactive with the hydrolyzed alkoxysilane.

2. The curable film-forming composition of claim 1 wherein the binder (a) comprises 3-glycidoxypropyl trimethoxysilane.

3. The curable film-forming composition of claim 1 wherein the polyglycidyl ether (c) comprises a diglycidyl ether and/or a triglycidyl ether.

4. The curable film-forming composition of claim 3 wherein the polyglycidyl ether (c) comprises resorcinol diglycidyl ether and/or trimethylol propane triglycidyl ether.

5. The curable film-forming composition of claim 1 wherein the metal oxide compound (b) comprises cerium oxide and/or tin oxide and the metal alkoxide (d) comprises titanium alkoxide.

6. The curable film-forming composition of claim 5 wherein the metal oxide compound (b) comprises cerium oxide and the metal alkoxide (d) comprises titanium n-butoxide.

7. The curable film-forming composition of claim 1, wherein after curing, the composition is transparent and demonstrates a refractive index greater than 1.5.

8. The film-forming composition of claim 1, wherein the curable film-forming composition is tinted.

9. The curable film-forming composition of claim 1, wherein the composition is thermally curable.

10. The curable film-forming composition of claim 1, wherein the weight ratio of the binder (a) to the polyglycidyl ether (c) in the curable film-forming composition ranges from 50:50 to 90:10.

11. An optical article comprising:
(a) a transparent substrate; and
(b) a curable film-forming sol-gel composition superimposed on at least one surface of the substrate; wherein the curable film-forming sol-gel composition comprises:
(i) a binder comprising a hydrolyzed alkoxysilane present in the curable film-forming composition in an amount ranging from 25 to 95 percent by weight, based on the total weight of solids in the curable film-forming composition;
(ii) a metal oxide compound containing titanium, zirconium, cerium, niobium, tantalum, and/or tin;
(iii) a polyglycidyl ether present in the curable film-forming composition in an amount ranging from 1 to 65 percent by weight, based on the total weight of solids in the curable film-forming composition; and
(iv) a metal alkoxide reactive with the hydrolyzed alkoxysilane.

12. The optical article of claim 11 wherein the substrate has a refractive index of at least 1.55.

13. (Currenty amended) The optical article of claim 12, wherein after curing, the film-forming composition is transparent and demonstrates a refractive index greater than 1.5.

14. The optical article of claim 11, wherein the difference between the refractive index of the substrate and the refractive index of the cured film-forming composition superimposed on the substrate surface is not more than +/−0.02.

15. The optical article of claim 12 wherein the substrate comprises polycarbonate, sulfur-containing polyurethane, and/or sulfur-containing polyurethane(urea).

16. The optical article of claim 11, further comprising (c) a film or coating superimposed on the curable film-forming composition of (b) and different therefrom.

17. The optical article of claim 16, wherein the film or coating (c) is an anti-reflective coating.

18. The optical article of claim 11 wherein the binder (i) in the curable film-forming composition comprises 3-glycidoxypropyl trimethoxysilane.

19. The optical article of claim 11 wherein the polyglycidyl ether (iii) in the curable film-forming composition comprises a diglycidyl ether and/or a triglycidyl ether.

20. The optical article of claim 19 wherein the polyglycidyl ether (iii) in the curable film-forming composition comprises resorcinol diglycidyl ether and/or trimethylol propane triglycidyl ether.

21. The optical article of claim 20 wherein the metal oxide compound (ii) comprises cerium oxide and the metal alkoxide (iv) comprises titanium n-butoxide.

22. The optical article of claim 11, wherein the curable film-forming composition (b) is tinted.

* * * * *